United States Patent
Li et al.

(10) Patent No.: US 10,031,517 B2
(45) Date of Patent: Jul. 24, 2018

(54) PRODUCTION RESOURCE MANAGEMENT USING GENETIC ALGORITHM

(71) Applicants: Wen-Syan Li, Fremont, CA (US); Yu Cheng, Shanghai (CN); Mengjiao Wang, Shanghai (CN)

(72) Inventors: Wen-Syan Li, Fremont, CA (US); Yu Cheng, Shanghai (CN); Mengjiao Wang, Shanghai (CN)

(73) Assignee: SAP SE, Walldorf (DE)

( * ) Notice: Subject to any disclaimer, the term of this patent is extended or adjusted under 35 U.S.C. 154(b) by 919 days.

(21) Appl. No.: 14/043,415

(22) Filed: Oct. 1, 2013

(65) Prior Publication Data

US 2015/0081077 A1 Mar. 19, 2015

(30) Foreign Application Priority Data

Sep. 18, 2013 (CN) .......................... 2013 1 0429078

(51) Int. Cl.
*G05B 19/418* (2006.01)

(52) U.S. Cl.
CPC .................. *G05B 19/41865* (2013.01); *G05B 2219/32304* (2013.01); *G05B 2219/32333* (2013.01);
(Continued)

(58) Field of Classification Search
CPC .... G05B 19/41865; G05B 2219/32333; G05B 2219/32304
See application file for complete search history.

(56) References Cited

U.S. PATENT DOCUMENTS 5,321,620 A * 6/1994 Tanaka ............. G05B 19/41865
                                                    700/104
5,841,659 A * 11/1998 Tanaka ................... G06Q 10/06
                                                    700/121

(Continued)

OTHER PUBLICATIONS

Kasra Ferdows, 'New world manufacturing order', Industrial Engineer (2003), pp. 28-33.*

(Continued)

*Primary Examiner* — Mohammad Ali
*Assistant Examiner* — Bernard G Lindsay
(74) *Attorney, Agent, or Firm* — Brakes Hughes Bellermann LLP

(57) ABSTRACT

In accordance with aspects of the disclosure, systems and methods are provided for managing production resources including scheduling production events for production resources used to manufacture products relative to time intervals while maintaining collaboration among the production resources. The systems and methods may include retrieving information related to each production resource, evaluating each production event for each product to determine a sequence of the production events, and generating potential production scheduling schemes for use of each production resource within the time intervals while maintaining collaboration among the production resources. The systems and methods may include generating a production schedule for the production events within the time intervals based on the potential production scheduling schemes for use of each production resource within the time intervals while maintaining collaboration among the production resources.

20 Claims, 12 Drawing Sheets

(52) U.S. Cl.
CPC ............... *Y02P 90/04* (2015.11); *Y02P 90/20* (2015.11); *Y02P 90/28* (2015.11)

(56) References Cited

U.S. PATENT DOCUMENTS

| | | | | |
|---|---|---|---|---|
| 6,662,167 | B1* | 12/2003 | Xiao | G06N 3/126 |
| | | | | 706/12 |
| 9,224,121 | B2* | 12/2015 | Li | G06Q 10/087 |
| 2007/0005522 | A1* | 1/2007 | Wren | G06Q 10/06 |
| | | | | 706/13 |
| 2011/0270429 | A1* | 11/2011 | Sidner | G06Q 10/06 |
| | | | | 700/100 |
| 2013/0066455 | A1* | 3/2013 | Li | G06Q 10/087 |
| | | | | 700/100 |
| 2014/0031965 | A1* | 1/2014 | Sun | G06F 17/00 |
| | | | | 700/100 |

OTHER PUBLICATIONS

Chan et al., 'Solving distributed FMS scheduling problems subject to maintenance: Genetic algorithms approach', Robotics and Computer-Integrated Manufacturing 22 (2006) 493-504.*

Moon et al. 'Integrated process planning and scheduling with minimizing total tardiness in multi-plants supply chain', Computers & Industrial Engineering 43 (2002) 331-349, Pergamon.*

* cited by examiner

PRODUCTION RESOURCE MANAGEMENT USING GENETIC ALGORITHM

CROSS-REFERENCE TO RELATED APPLICATION

This application claims priority under 35 U.S.C. § 119 to Chinese Patent Application 201310429078.0, filed Sep. 18, 2013, titled "PRODUCTION RESOURCE MANAGEMENT", which is incorporated herein by reference in its entirety.

TECHNICAL FIELD

The present description relates to various computer-based techniques for production resource management.

BACKGROUND

Generally, manufacturing involves producing products for sale, e.g., by constructing products from component parts. In typical manufactory environments, each product may require using multiple resources. As many products may use different but possibly shared resources, production scheduling is a complex process, where production scheduling is considered important when analyzing profitability. Since many parameters, variables, and objectives may be introduced in production scheduling, decision-making and calculations to develop efficient solutions may be considered difficult. As such, there is a need to optimize processes for determining production scheduling.

SUMMARY

In accordance with aspects of the disclosure, a computer system may be provided for production resource management including instructions stored on a non-transitory computer-readable medium and executable by at least one processor. The computer system may include a production scheduling manager configured to cause the at least one processor to schedule production events for each of a plurality of production resources used to manufacture one or more products relative to one or more time intervals while maintaining collaboration among the production resources. The production scheduling manager may include a production resource handler configured to retrieve information related to each production resource and evaluate each production event for each product to determine a sequence of the production events. The production scheduling manager may include a production scheduling coordinator configured to generate one or more potential production scheduling schemes for use of each production resource within the one or more time intervals while maintaining collaboration among the production resources. The production scheduling manager may include a production scheduling optimizer configured to generate a production schedule for the production events within the one or more time intervals based on the one or more potential production scheduling schemes for use of each production resource within the one or more time intervals while maintaining collaboration among the production resources.

In some implementations, one or more of the production resources may be configured to manufacture one or more different component parts for each product. One or more of the production resources may be configured to transport one or more different component parts for each product. One or more of the production resources may be configured to assemble one or more different component parts for each product. One or more of the products may be assembled from a plurality of different component parts manufactured by one or more different production resources of the plurality of production resources. Scheduling the production events for each of a plurality of production resources may include moving production of one or more component parts between production resources to insure assembly of the one or more products according to a workflow of a production cycle including the sequence of the production events.

In some implementations, production events may include manufacturing component parts for each product and transporting the manufactured component parts for assembly of the products, and production events may include assembly of the products relative to the one or more time intervals, and assembly includes following a workflow of a production cycle including the sequence of the production events. The production resources may include one or more of manufacturing facilities, transporting facilities, and assembling facilities. The production scheduling optimizer may be configured to optimize the production schedule by reducing a time for manufacturing the one or more products by the production resources and reducing a cost of transporting the one or more products. The production resource handler may be configured to retrieve information related to one or more components parts of each product and retrieve information related to the sequence of the production events for manufacturing each product by the production resources as input for modeling as a chromosome by the production scheduling coordinator. The production scheduling coordinator may be configured to generate the one or more potential production scheduling schemes based on retrieved information that is modeled as the chromosome.

In some implementations, the production scheduling coordinator may comprise a genetic algorithm handler including a chromosome comparator configured to compare a plurality of production scheduling chromosomes, each production scheduling chromosome including the one or more potential production scheduling schemes for use of each production resource within the one or more time intervals while maintaining collaboration among the production resources, and configured to compare each of the plurality of production scheduling chromosomes relative to maintaining collaboration among the production resources, to thereby output a selected subset of the plurality of production scheduling chromosomes. The genetic algorithm handler may include a chromosome combiner configured to combine production scheduling chromosomes of the selected subset of the production scheduling chromosomes to obtain a next generation of production scheduling chromosomes for output to the chromosome comparator and for subsequent comparison therewith of the next generation of production scheduling chromosomes with respect to maintaining collaboration among the production resources, as part of an evolutionary loop of the production scheduling chromosomes between the chromosome comparator and the chromosome combiner.

In some implementations, the production scheduling optimizer may be configured to monitor the evolutionary loop and select a selected production scheduling chromosome therefrom for implementation of the production schedule based thereon. The chromosome combiner may be configured to combine the production scheduling chromosomes including selecting pairs of production scheduling chromosomes and crossing over portions of each pair of production scheduling chromosomes to obtain a child chromosome of the next generation. At least a portion of the evolutionary loop may be executed using parallel processes in which each generation of production scheduling chromosomes is divided into sub-groups for parallel processing thereof. The production scheduling optimizer may be configured to select the selected production scheduling chromosome after a predetermined number of generations of the evolutionary loop, or after determining that the selected production scheduling chromosome satisfies maintaining collaboration among the production resources to a predetermined extent.

In accordance with aspects of the disclosure, a computer program product may be provided for production resource management and may be tangibly embodied on a non-transitory computer-readable storage medium and include instructions that, when executed by at least one processor, are configured to schedule production events for each of a plurality of production resources used to manufacture one or more products relative to one or more time intervals while maintaining collaboration among the production resources. The instructions, when executed by the at least one processor, may be configured to retrieve information related to each production resource, evaluate each production event for each product to determine a sequence of the production events, generate one or more potential production scheduling schemes for use of each production resource within the one or more time intervals while maintaining collaboration among the production resources, and generate a production schedule for the production events within the one or more time intervals based on the one or more potential production scheduling schemes for use of each production resource within the one or more time intervals while maintaining collaboration among the production resources.

In some implementations, the computer program product may include instructions that, when executed by the processor, are configured to compare a plurality of production scheduling chromosomes, each production scheduling chromosome including the one or more potential production scheduling schemes for use of each production resource within the one or more time intervals while maintaining collaboration among the production resources, compare each of the plurality of production scheduling chromosomes relative to maintaining collaboration among the production resources, to thereby output a selected subset of the plurality of production scheduling chromosomes, combine production scheduling chromosomes of the selected subset of the production scheduling chromosomes to obtain a next generation of production scheduling chromosomes and for subsequent comparison therewith of the next generation of production scheduling chromosomes with respect to maintaining collaboration among the production resources, as part of an evolutionary loop of the production scheduling chromosomes, and monitor the evolutionary loop and selecting a selected production scheduling chromosome therefrom for implementation of the production schedule based thereon.

In some implementations, the computer program product may include instructions that, when executed by the processor, are configured to combine the production scheduling chromosomes including selecting pairs of production scheduling chromosomes and crossing over portions of each pair of production scheduling chromosomes to obtain a child chromosome of the next generation, execute at least a portion of the evolutionary loop using parallel processes in which each generation of production scheduling chromosomes is divided into sub-groups for parallel processing thereof, and select the selected production scheduling chromosome after a predetermined number of generations of the evolutionary loop, or after determining that the selected production scheduling chromosome satisfies maintaining collaboration among the production resources to a predetermined extent.

In accordance with aspects of the disclosure, a computer-implemented method may be provided for production resource management. The method may include scheduling production events for each of a plurality of production resources used to manufacture one or more products relative to one or more time intervals while maintaining collaboration among the production resources by retrieving information related to each production resource, evaluating each production event for each product to determine a sequence of the production events, generating one or more potential production scheduling schemes for use of each production resource within the one or more time intervals while maintaining collaboration among the production resources, and generating a production schedule for the production events within the one or more time intervals based on the one or more potential production scheduling schemes for use of each production resource within the one or more time intervals while maintaining collaboration among the production resources.

In some implementations, the method may include comparing a plurality of production scheduling chromosomes with each production scheduling chromosome including the one or more potential production scheduling schemes for use of each production resource within the one or more time intervals while maintaining collaboration among the production resources. The method may include comparing each of the plurality of production scheduling chromosomes relative to maintaining collaboration among the production resources, to thereby output a selected subset of the plurality of production scheduling chromosomes. The method may include combining production scheduling chromosomes of the selected subset of the production scheduling chromosomes to obtain a next generation of production scheduling chromosomes and for subsequent comparison therewith of the next generation of production scheduling chromosomes with respect to maintaining collaboration among the production resources, as part of an evolutionary loop of the production scheduling chromosomes. The method may include monitoring the evolutionary loop and selecting a selected production scheduling chromosome therefrom for implementation of the production schedule based thereon. The method may include combining the production scheduling chromosomes including selecting pairs of production scheduling chromosomes and crossing over portions of each pair of production scheduling chromosomes to obtain a child chromosome of the next generation. The method may include executing at least a portion of the evolutionary loop using parallel processes in which each generation of production scheduling chromosomes is divided into sub-groups for parallel processing thereof. The method may include selecting the selected production scheduling chromosome after a predetermined number of generations of the evolutionary loop, or after determining that the selected production scheduling chromosome satisfies maintaining collaboration among the production resources to a predetermined extent.

The details of one or more implementations are set forth in the accompanying drawings and the description below. Other features will be apparent from the description and drawings, and from the claims.

DETAILED DESCRIPTION

Figure 1A:
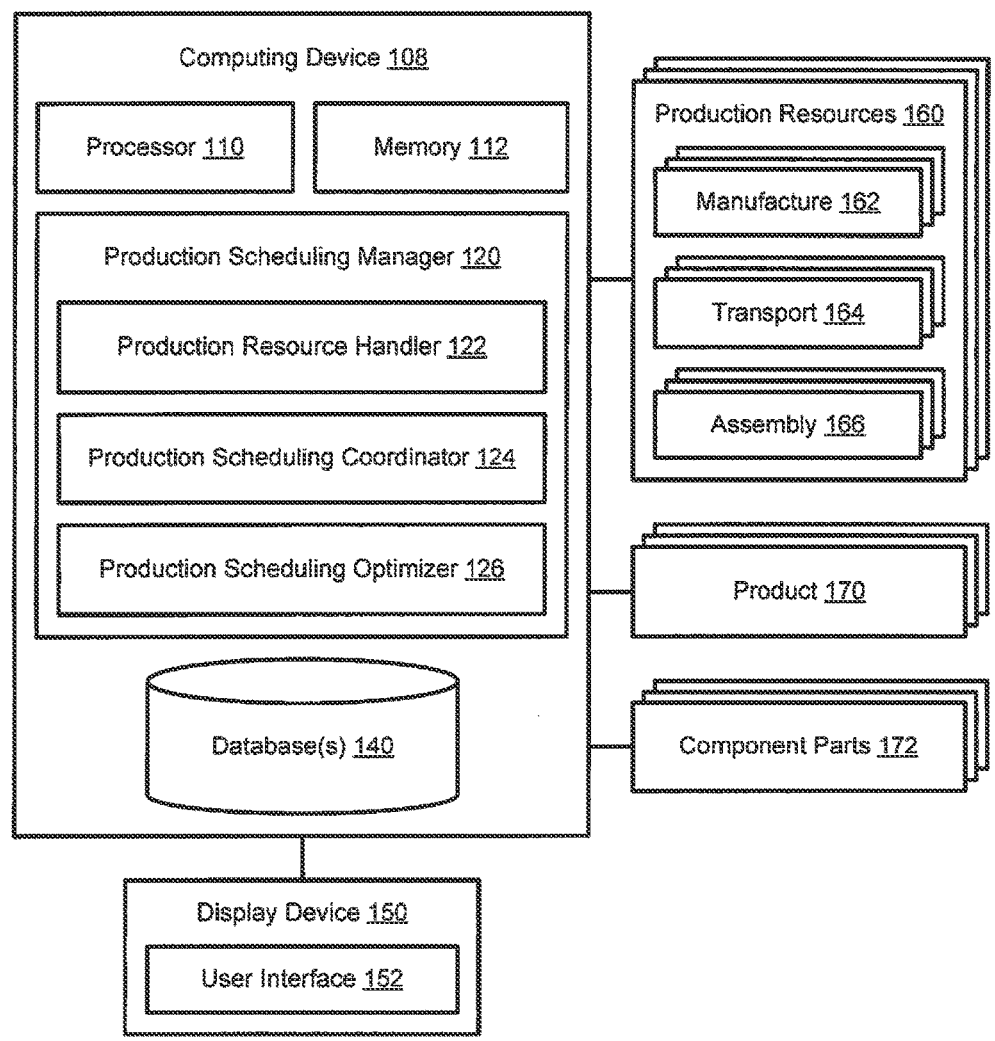
FIGS. 1A-1C are block diagrams illustrating various example systems for production resource management, in accordance with aspects of the disclosure.

FIG. 1A is a diagram illustrating an example system 100 for production resource management by implementing a production scheduling manager for managing, coordinating, and optimizing production scheduling, in accordance with aspects of the disclosure. In some examples, production resource management may involve considering collaboration among multiple production resources.

In various implementations, the example system 100 may be configured for managing production resource scheduling while maintaining collaboration among a plurality of entities, such as facilities, factories, etc. For instance, the example system 100 may be applied to medical treatments for patients received in different hospitals and manufacturing of products made in different factories. For simplicity of explanation, the description provided herein references production and manufactory as an implementation for illustration. For instance, a product may be assembled from multiple components (i.e., component parts), where each component may be produced in different factories, and an assembly procedure may follow a workflow that includes a sequence of connected production events. Further, aspects of the disclosure are directed to using a genetic algorithm (GA) based distributed resource scheduling system and method thereof, where production and manufactory with collaboration among multiple factories is described as an implementation. With this genetic algorithm (GA) approach, aspects of the disclosure are directed to an effective GA encoding system and method.

In the example of FIG. 1A, the system 100 comprises a computer system for implementing a production resource management system that may be associated with a computing device 108, thereby transforming the computing device 108 into a special purpose machine designed to determine and implement various production scheduling process(es), as described herein. In this sense, the computing device 108 may include any standard element(s) and/or component(s), including at least one processor(s) 110, memory 112 (e.g., non-transitory computer-readable storage medium), database(s) 140, power, peripherals, and various other computing elements and/or components that may not be specifically shown in FIG. 1A. Further, the system 100 may be associated with a display device 102 (e.g., a monitor or other display) that may be used to provide a user interface (UI) 152, such as, in some examples, a graphical user interface (GUI). In an implementation, the UI 152 may be used, for example, to receive preferences from a user for managing the system 100. As such, various other elements and/or components of the system 100 that may be useful to implement the system 100 may be added or included, as would be apparent to one of ordinary skill in the art.

The production resource management system 100 may include the computing device 108 and instructions recorded/stored on the non-transitory computer-readable medium 112 and executable by the at least one processor 110. In some examples, the production resource management system 100 may include the display device 102 for providing output to a user, and the display device 102 may include the UI 152 for receiving input from the user.

In the example of FIG. 1A, the production resource management system 100 may include a production scheduling manager 120 configured to cause the at least one processor 110 to schedule production events for each of a plurality of production resources 160 used to manufacture one or more products 170 relative to one or more time intervals while maintaining collaboration among the production resources 160. In some examples, the production events may include manufacturing component parts 172 for each product 170 and transporting the manufactured component parts 172 for assembly of the products 170. Further, the production events may include assembly of the products 170 relative to the one or more time intervals, and assembly may include following a workflow of a production cycle including the sequence of the production events.

In some implementations, the production scheduling manager 120 may be configured to schedule production events and/or operations of the production resources 160, which may include one or more manufacture facilities 162, one or more transport facilities 164, and/or one or more assembly facilities 166. The production scheduling manager 120 may be configured to schedule production events to optimize the production resources 160 in a desired manner, while maintaining collaboration among the production resources 160. In some examples, the production scheduling manager 120 may achieve production and collaboration goals in a fast, efficient, repeatable manner, and for widely-ranging examples of numbers, types, and job objectives and requirements of various production scheduling scenarios, in a manner as described herein.

In some examples, the production resources 160 may include manufacture facilities 162 (e.g., entities, factories, etc.) that may be configured to manufacture one or more (same or different) component parts 172 for each product 172. In some examples, the production resources 160 may include transport facilities 164 that may be configured to transport one or more of the (same or different) component parts 172 for each product 170. In some examples, the production resources 160 may include assembly facilities 166 that may be configured to assemble one or more of the (same or different) component parts 172 for each product 170. As such, in some examples, one or more of the products 170 may be assembled from the (same or different) component parts 172 manufactured by one or more of the (same or different) production resources 160.

In the example of FIG. 1A, the production scheduling manager 120 may include a production resource handler 122 configured to retrieve information related to each production resource 160 and evaluate each production event for each product 170 to determine a sequence of the production events. In some implementations, the production resource handler 122 may be configured to retrieve information related to the components parts 172 of each product 170 and retrieve information related to the sequence of the production events for manufacturing each product 170 by the production resources 160 as input for modeling as a chromosome by the production scheduling coordinator 124.

In the example of FIG. 1A, the production scheduling manager 120 may include a production scheduling coordinator 124 configured to generate one or more potential production scheduling schemes for use of each production resource 160 within the one or more time intervals while maintaining collaboration among the production resources 160. In some implementations, the production scheduling coordinator 124 may be configured to generate the one or more potential production scheduling schemes based on retrieved information that is modeled as the chromosome.

In the example of FIG. 1A, the production scheduling manager 120 may include a production scheduling optimizer 126 configured to generate a production schedule for the production events within the one or more time intervals based on the one or more potential production scheduling schemes for use of each production resource 160 within the one or more time intervals while maintaining collaboration among the production resources 160. The production scheduling optimizer 126 may be configured to optimize the production schedule by, for example, reducing a time for manufacturing the one or more products 170 by the production resources 160 and further by, for example, reducing a cost of transporting the one or more products 170.

In some implementations, scheduling the production events for each of the production resources 160 may include moving production of one or more component parts 172 between the production resources 160 to insure assembly of the one or more products 170 according to a workflow of a production cycle including the sequence of the production events. In some examples, the production events may include manufacturing component parts 172 for each product 170 and transporting the manufactured component parts 172 for assembly of the products 170. In other examples, the production events may include assembly of the products 170 relative to the one or more time intervals, and assembly may include following a workflow of a production cycle including the sequence of the production events.

In some implementations, each production resource 160 may include one or more entities, factories, etc. including, for example, one or more manufacture facilities 162, one or more transport facilities 164, and/or one or more assembly facilities 166. For instance, the manufacturing facilities 162 may be used to produce component parts 172 for the products 170, the transport facilities 164 may be used to transport the component parts 172 for the products 170, and the assembly facilities 164 to assemble the components parts 172 for the products 170. As such, the production resources 160 may be used to manufacture, transport, and assemble the components parts 172 into the one or more products 170. In another instance, along assembly lines, separate assembly stations may be designated at which workers (e.g., machine operators, assemblers, etc.) perform a repeated assembly task of the component parts 172 in a highly-specialized and efficient manner, so that the sum total of such assembly tasks of the component parts 172 results in completion of the products 170. In an example of such assembly lines, an automobile may be mass produced by assembling various component parts (e.g., frame, windshield, doors, engine, and so on) into a finished automobile.

In some implementations, manufacture, transport, and assembly lines may represent examples of production resources 160 for manufacturing, transporting, and assembling facilities. Further, suppliers may be considered other examples of production resources 160 ranging from local wholesalers to providers located in different parts of the country. In any event, the production scheduling manager 120 may accomplish a goal of dealing with collaboration of these and other production resources 160 inherent to manufacturing, transporting, and assembly processes to enable production scheduling in such a manner that enables an administrator of the production resource 160 to accomplish a desired goal of, for example, optimizing production profitability.

In other implementations, the production scheduling manager 120 may be configured to utilize historical sales data stored in the database 140 for the product 170 to be manufactured to provide a predicted level of demand by consumers. Such forecasts may be short-term and/or long-term and may be made with varying levels of specificity, e.g., with respect to various customer demographics, seasonal variations in sales levels, and various other variables. In some examples, the production scheduling manager 120 may include and use a sales forecaster to implement regression techniques to make sales forecasts to further optimize production profitability.

Further, the production scheduling manager 120 may use various other types of data stored in the database 140 related to constraints and/or objectives that may be known or thought to influence, control, and/or otherwise influence events and/or operations of the production resources 160. For instance, data related to the manufacture facilities 162 and the transport facilities 164 may be stored in the database 140, and this manufacture/transport data may describe a current, historical, and/or maximum capacity of the manufacture and transport facilities 162, 164. The manufacture/transport data may describe time and/or cost constraints and/or objectives associated with manufacturing and transporting the products 170. In another instance, data related to the assembly facilities 166 may be stored in the database 140, and the assembly data may describe past, present, and/or predicted data about assembly of each product 170 from the component parts 172, such as, for example, production capacity for each component part 170, assembly times for each product 170, and cost analysis information related to assembling each product 170 from the component parts 172. Further, in still another instance, data related to the various production resources 160 may be stored in the database 140 and may describe data associated with past, present, and/or predicted production events and/or operations of each production resource 160. For example, such data may include cost(s) in time and/or capital of switching production events and/or operations from a first product to a second product, since such switches may be necessary and may vary widely in extent to which line operators need to re-tool or otherwise re-configure.

In various implementations, it should be appreciated that any example data is intended merely as non-limiting examples, and any additional and/or alternative types of data may be used in production events and/or operations of the production scheduling manager 120. For instance, data may be stored, e.g., in one or more databases 140 and/or elsewhere, regarding an extent to which different products 170 to be produced share one or more component parts 172. In some examples, when automobiles are produced, two different types of cars may use the same braking system and related part(s). Such usage of component parts may reduce a cost associated with switching the assembly facilities 166 from assembling the first car to assembling the second car.

In some instances, such data may be related to the production resources 160 and may further relate to, or be defined by, the nature and/or type of manufacturing facility and/or products being produced in question. In some instances, the production resources 160 may conduct testing (e.g., for quality control) on partially or completely finished products 170. In these and various other scenarios and situations, the production scheduling manager 120 may be instrumental in allocating associated production resources 160 in one or more time intervals, so as to achieve a desired business goal. In some other examples, the production scheduling manager 120 may be configured to select an optimal or near-optimal production scheduling scheme or solution that defines specific time intervals during which associated production resources 160 (e.g., the manufacture facilities 162, the transport facilities 164, and the assembly facilities 166) may be used to obtain a desired result.

In accordance with aspects of the disclosure, the production scheduling manager 120 in conjunction with the production resource handler 122, the production scheduling coordinator 124, and the production scheduling optimizer 126 may be used to generate at least one production schedule to include a particular production scheduling scheme and/or solution for use in scheduling actual usage of the production resources 160 including one or more of the manufacture facilities 162, the transport facilities 164, and the assembly facilities 166.

In some implementations, there are types of production financial activities that may impact daily production capacity and production cash flow levels. Some examples include asset related activities for accounts receivable (AR) and liability related activities for accounts payable (AP). For instance, asset related activities for accounts receivable may refer to revenue, income, and/or cash inflow to the cash reserve, and liability related activities for accounts payable may refer to debt, payment, and/or cash outflow from the cash reserve. Some example requirement(s) for production resource management may provide for maintaining a desirable or predetermined cash reserve level that may be set in a desired or predetermined manner. Since working capital or cash inflow may only be estimated and not controlled, then as accounts receivables are received as revenue, at least one parameter may be configured that refers to a confidence (or risk) level of a cash inflow estimation strategy.

In the example of FIG. 1A, the production resource management system 100 is illustrated using various functional blocks or modules that represent more-or-less discrete functionality. However, such illustration is provided for clarity and convenience, and thus, the various functionalities may overlap or be combined within a described block(s) or module(s), and/or may be implemented by one or more block(s) or module(s) not specifically illustrated in the example of FIG. 1A. As such, it should be appreciated that conventional functionality that may be considered useful to the system 100 of FIG. 1A may be included as well even though such conventional elements are not illustrated explicitly, for the sake of clarity and convenience.

Figure 1B:
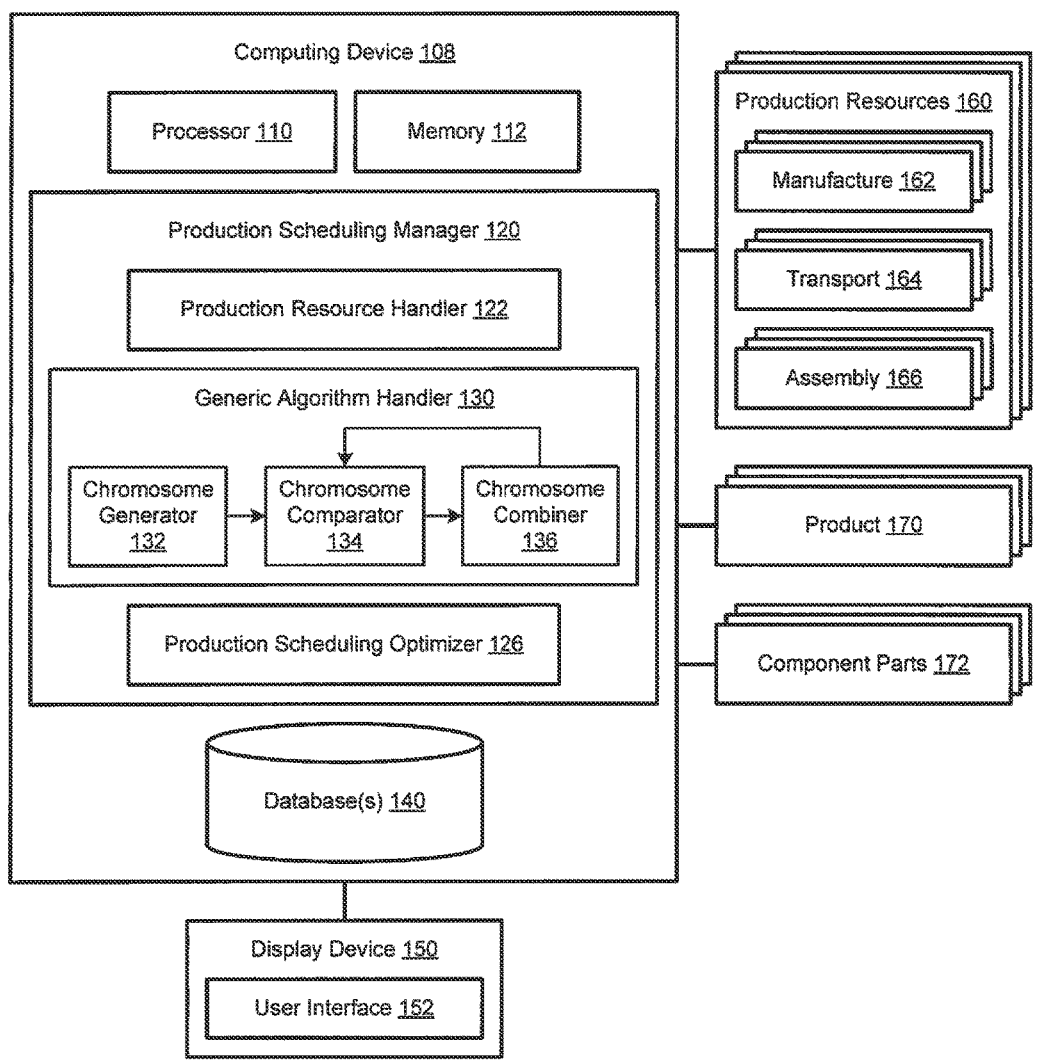

FIG. 1B is a block diagram illustrating another example system 102 for production resource management by implementing a genetic algorithm (GA) to manage, coordinate, and optimize production scheduling, in accordance with aspects of the disclosure. In some examples, as described herein, production resource management may involve considering collaboration among multiple production resources.

In an implementation, the system 102 comprises a computer system for implementing a production resource management system that may be associated with the computing device 108 of the system 100 of FIG. 1A. As such, to simplify the following discussion, similar components of the system 102 of FIG. 1B may include the same scope and functionality of the system 100 of FIG. 1A, thereby transforming the computing device 108 of FIG. 1B into a special purpose machine designed to determine and implement production scheduling process(es), as described herein.

In an implementation, the production scheduling coordinator 124 of the system 100 of FIG. 1A may be configured as a genetic algorithm handler 130. Thus, in the example of FIG. 1B, the production scheduling manager 120 of the system 102 may include the genetic algorithm handler 130. In some examples, the genetic algorithm handler 130 may be configured to implement a randomized algorithm approach known as a genetic algorithm (GA), which may refer to a computer simulation of Darwinian natural selection that iterates through successive generations to converge toward a best solution in a problem/solution space. Such a genetic algorithm (GA) may be used by the system 102 to consider various requirements, parameters, constraints, and/or objectives into the production scheduling optimization process. Further, in some examples, the production resource management system 102 may be considered capable of recommending and/or selecting "best-available" production scheduling schemes, as described herein.

In the system 102, the genetic algorithm approach may be implemented, for example, by creating one or more "chromosomes" representing a possible solution to the problem of generating a production scheduling scheme. Specific examples of such production scheduling chromosomes are described herein. However, generally speaking, it should be appreciated that such production scheduling chromosomes may include one or more potential production scheduling schemes for each production resource 160 based on the production events for each production resource 160.

Further, it should be appreciated that such potential production scheduling schemes may be used to compare each production scheduling chromosome relative to the collaboration of the production resources 160, to thereby output a selected subset of production scheduling chromosomes. Therefore, there may be a single such production scheduling chromosome that may represent a single best production scheduling solution for a given set of production scheduling objectives to thereby maximize and/or optimize production time, cost, and efficiency. However, optimization of potential production scheduling schemes (i.e., production scheduling chromosomes) may be relative to needs of a user and various other factors including objectives, constraints, parameters, and/or requirements. In some instances, due to the nature of the genetic algorithms used herein, the production scheduling manager 120 may be configured to find a "best" solution that is close to an optimal solution, even if the actual optimal solution is not identifiable as such.

In this regard, the production scheduling manager 120 may be configured to optimize production scheduling relative to one or more objectives. One such metric may include profitability. For instance, some products may be more profitable than other products, and/or profitability may be enhanced by exhibiting a preference for behaviors associated with increased profitability. On the other hand, other additional or alternative metrics may have value besides pure profitability. For instance, a gain in market share may be a valuable metric to consider.

As such, in an example, the production scheduling optimizer 126 may be configured for tuning preferences to provide designations between possible objectives of the production scheduling manager 120, and it should be appreciated that various factors including constraints, parameters, and/or requirements may be considered to be necessary or optional. For instance, in scenarios in which profitability should be optimized, a full utilization of the genetic algorithm may be an option but may not be a requirement.

The production scheduling manager 120 may be configured to utilize the genetic algorithm via the genetic algorithm handler 130 to create, compare, and combine multiple production scheduling chromosomes in a manner to thereby create a new generation or population of production scheduling chromosomes for evaluation so that a subset thereof may be selected for reproduction and subsequent evaluation. In this way, each generation and/or population of production scheduling chromosomes may tend to converge toward an optimal solution for potential production scheduling schemes. In some examples, the production scheduling optimizer 126 may be configured to select a particular production scheduling solution (i.e., one of the potential production scheduling schemes or one of the production scheduling chromosomes) for use in determining or selecting a best potential production scheduling schemes.

In the example of FIG. 1B, the genetic algorithm handler 130 may include a chromosome generator 132 that may be configured for generating/creating one or more production scheduling chromosomes. In some instances, such production scheduling chromosome generation may occur at random or may include some initial constraints, guidelines, and/or restrictions. The chromosome generator 132 may be configured to generate an initial population or set of production scheduling chromosomes, which may be evaluated by a chromosome comparator 134 that may be configured for comparing each production scheduling chromosome including the one or more potential production scheduling schemes for use of each production resource 160 within the one or more time intervals based on the production events for each production resource 160. The chromosome generator 132 may be configured to compare a plurality of production scheduling chromosomes, where each production scheduling chromosome may include the one or more potential production scheduling schemes for use of each production resource 160 within the one or more time intervals while maintaining collaboration among the production resources 160. The chromosome generator 132 may be configured to compare each of the plurality of production scheduling chromosomes relative to maintaining collaboration among the production resources 160, to thereby output a selected subset of the plurality of production scheduling chromosomes. These and various other related aspects are described in greater detail herein.

The chromosome combiner 136 may be configured to receive the selected subset of the plurality of production scheduling chromosomes and may be configured to combine (e.g., crossover and mutate) production scheduling chromosomes of the selected subset of the plurality of production scheduling chromosomes to obtain a next generation (population) of production scheduling chromosomes for output to the chromosome comparator 134, which may then perform another, subsequent comparison therewith of the next generation of production scheduling chromosomes with respect to maintaining collaboration among the production resources 160, as part of an evolutionary loop of successive generations of the plurality of production scheduling chromosomes between the chromosome comparator 134 and chromosome combiner 136. With each successive generation, the new population of production scheduling chromosomes may represent or include possible improved or near-optimal schedule(s). In some implementations, new generations and/or populations may be iteratively created until either an optimal solution is met, or until factors, preferences, and/or requirements are met up to some pre-defined satisfactory level or threshold, or until a pre-determined number of generations is calculated, or until time runs out to compute new generations/populations (at which point a best solution of the current generation may be selected).

The production scheduling optimizer 126 may be configured to monitor the evolutionary loop and to select a selected production scheduling chromosome therefrom for implementation of the production scheduling scheme based thereon. As referenced herein, the selected production scheduling chromosome and/or solution may represent either a best (optimal or near optimal) solution, or may represent a best-available solution. Thus, the production scheduling optimizer 126 may be tasked with determining whether, when, and how to interrupt or otherwise end the evolutionary loop and extract a best, best-available, optimal, or near optimal solution. Then, the production scheduling optimizer 126 may output a selected production scheduling chromosome and/or execute an actual production schedule.

In the example of FIG. 1B, the chromosome combiner 136 may be further configured to combine the production scheduling chromosomes including selecting pairs of production scheduling chromosomes and crossing over portions of each pair of production scheduling chromosomes to obtain a child chromosome of the next generation. In an implementation, at least a portion of the evolutionary loop may be executed using parallel processes in which each generation of production scheduling chromosomes is divided into sub-groups for parallel processing thereof. In this instance, the production scheduling optimizer 126 may be further configured to select the selected production scheduling chromosome after a predetermined number of generations of the evolutionary loop, or after determining that the selected production scheduling chromosome satisfies the constraints to a predetermined extent.

In the example of FIG. 1B, it should be appreciated that the production resource management system 102 is illustrated using various functional blocks or modules that represent more-or-less discrete functionality. However, such illustration is provided for clarity and convenience, and thus, it should be appreciated that the various functionalities may overlap or be combined within a described block(s) or module(s), and/or may be implemented by one or more block(s) or module(s) not specifically illustrated in the example of FIG. 1B. As such, it should be appreciated that conventional functionality that may be considered useful to the system 102 of FIG. 1B may be included as well even though such conventional elements are not illustrated explicitly, for the sake of clarity and convenience.

Figure 1C:
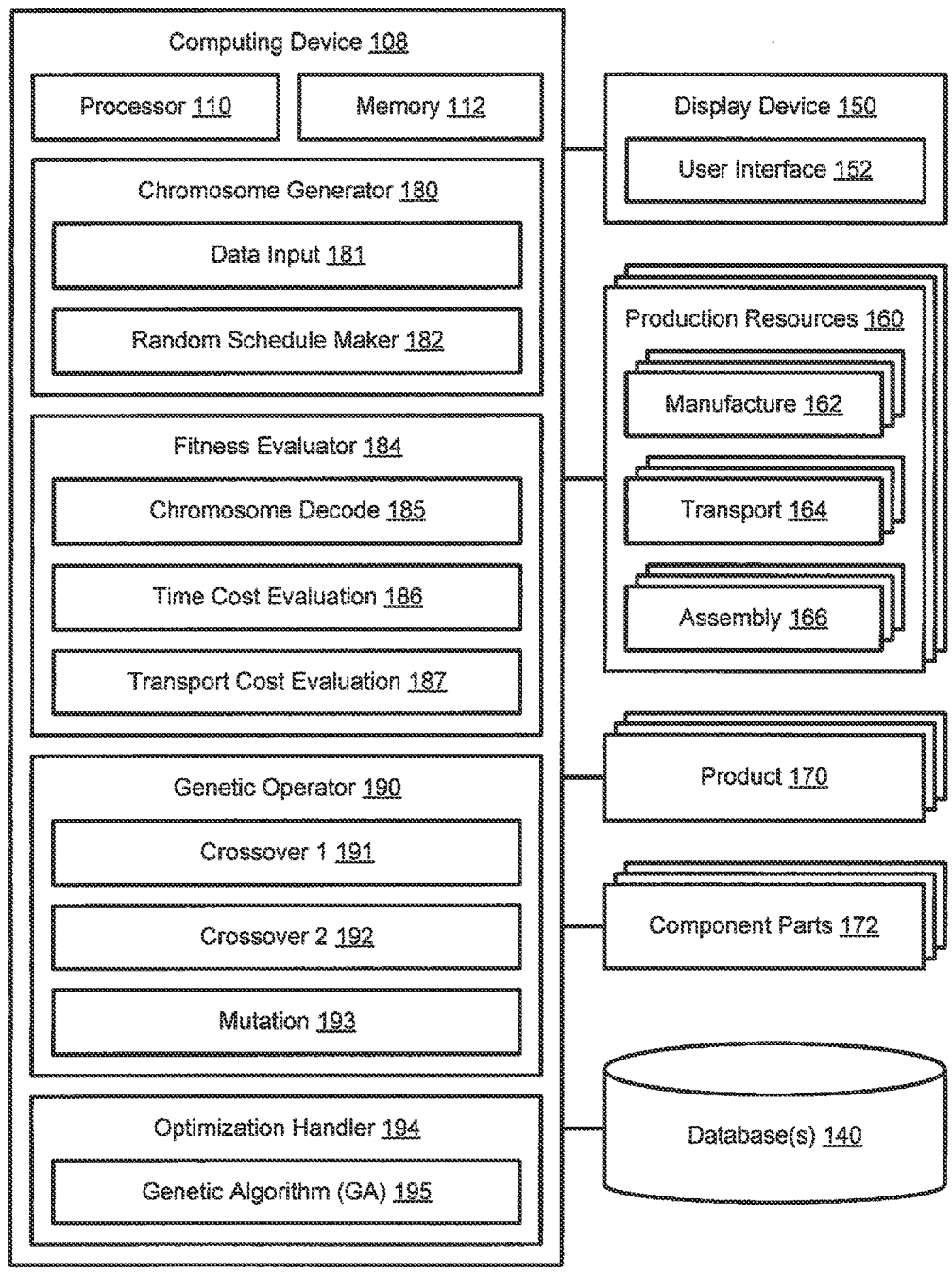

FIG. 1C is a block diagram illustrating another example system 104 for production resource management by implementing a fitness evaluator and a genetic operator for production scheduling, in accordance with aspects of the disclosure. In some examples, as described herein, production resource management may involve considering collaboration among multiple production resources.

In an implementation, the system 104 comprises a computer system for implementing a production resource management system that may be associated with the computing device 108 of the system 100 of FIG. 1A. As such, to simplify the following discussion, similar components of the system 104 of FIG. 1C may include the same scope and functionality of the system 100 of FIG. 1A, thereby transforming the computing device 108 of FIG. 1C into a special purpose machine configured for genetic algorithm (GA) based manufacturing management designed to determine and implement production scheduling process(es), in a manner as described herein.

The computing device 108 may include a chromosome generator 180 having a data input module 181 and random schedule maker module 182. In some examples, the chromosome generator 180 may be configured for generating production scheduling chromosomes. The data input module 181 may be configured to retrieve information related to the components parts 172 related to each product 170 and retrieve information related to a sequence of production events for manufacturing each product 170 by the production resources 160 as input for modeling as a chromosome. Further, production scheduling chromosome generation may occur at random with the random schedule maker module 182. The chromosome generator 180 may be configured to generate an initial population or set of production scheduling chromosomes, which may be evaluated by a fitness evaluator 184 that may be configured for comparing each production scheduling chromosome for use of each production resource 160 within one or more time intervals based on production events for each production resource 160. The chromosome generator 180 may be configured to compare each production scheduling chromosome while maintaining collaboration among the production resources 160, to thereby output a selected subset of production scheduling chromosomes.

The computing device 108 may include the fitness evaluator 184 having a chromosome decode module 185, a time cost evaluation module 186, and a transport cost evaluation module 187. In some examples, from each chromosome, a workflow of all product manufacturing may be generated. From a viewpoint of chromosome decoding with the chromosome decode module 185, each chromosome may be represented as a manufacturing schedule for all the factories (e.g., production entities, facilities, etc.). As described herein, one chromosome may be decoded as a manufacturing schedule for factories, where component parts may be produced in various sequences, waiting time may be due to limitation of production capacity in each factory, and length of manufacturing list may be different among factories. For simplicity, in some examples, manufacturing of various component parts cost the same time, where, i.e., time cost of a whole manufacturing workflow may be obtained, which may describe a maximum time requirement to finish manufacturing in all the factories.

In some examples, the time cost evaluation module 186 and the transport cost evaluation module 187 may be used to optimize manufacture schedules by reducing total manufacturing time and reducing transportation cost. Since manufacture scheduling may be complicated as the number of products, component parts, and factories may be large, the computing device 108 may be configured to use the time cost evaluation module 186 and the transport cost evaluation module 187 in conjunction with a genetic algorithm (GA) to optimize manufacture scheduling. As such, in some examples, the computing device 108 may include a genetic operator 190 having a first crossover module 191, a second crossover module 192, and a mutation module 193, which are implemented in a manner as described herein. Further, in some examples, the computing device 108 may include an optimization handler 194 having a genetic algorithm (GA) module 195, which are implemented in a manner as described herein.

In some examples, the genetic operator 190 and the optimization handler 194 may be configured to implement a genetic algorithm (GA), which aims to minimize time cost of manufacturing procedures and further minimize transport cost of component parts (tasks). When a number of products, component parts, and factories are large, minimization becomes a NP-hard problem. The GA may be used as a method for solving optimization problems based on natural selection process(es) that mimic biological evolution. As further described herein, the GA may be configured to repeatedly modify a population of individual solutions. At each step, the GA may be configured to randomly select individuals from the current population and use them as parents to produce children for a next generation. Over successive generations, the population may "evolve" toward an optimal solution. These and various other related aspects of the disclosure are described in greater detail herein.

In some examples, the genetic operator 190 and optimization handler 194 may be configured to receive selected subsets of production scheduling chromosomes to combine (e.g., crossover and mutate with one or more of the crossover 1 module 191, the crossover 2 module 192, and the mutation module 193, as described herein) production scheduling chromosomes of selected subsets of production scheduling chromosomes to obtain a next generation (population) of production scheduling chromosomes for output, and then perform another, subsequent comparison therewith of the next generation of production scheduling chromosomes with respect to maintaining collaboration among the production resources 160, as part of an evolutionary loop of successive generations of the production scheduling chromosomes. Further, in some examples, with each successive generation, the new population of production scheduling chromosomes may represent or include possible improved or near-optimal schedule(s), and new generations/populations may be iteratively generated until either an optimal solution is met, or until objectives, factors, parameters, preferences, and/or requirements are met up to some predefined satisfactory level or threshold, and/or until a predetermined number of generations is calculated, or until time runs out to compute new generations/populations (at which point a best solution of the current generation may be selected).

Figure 2:
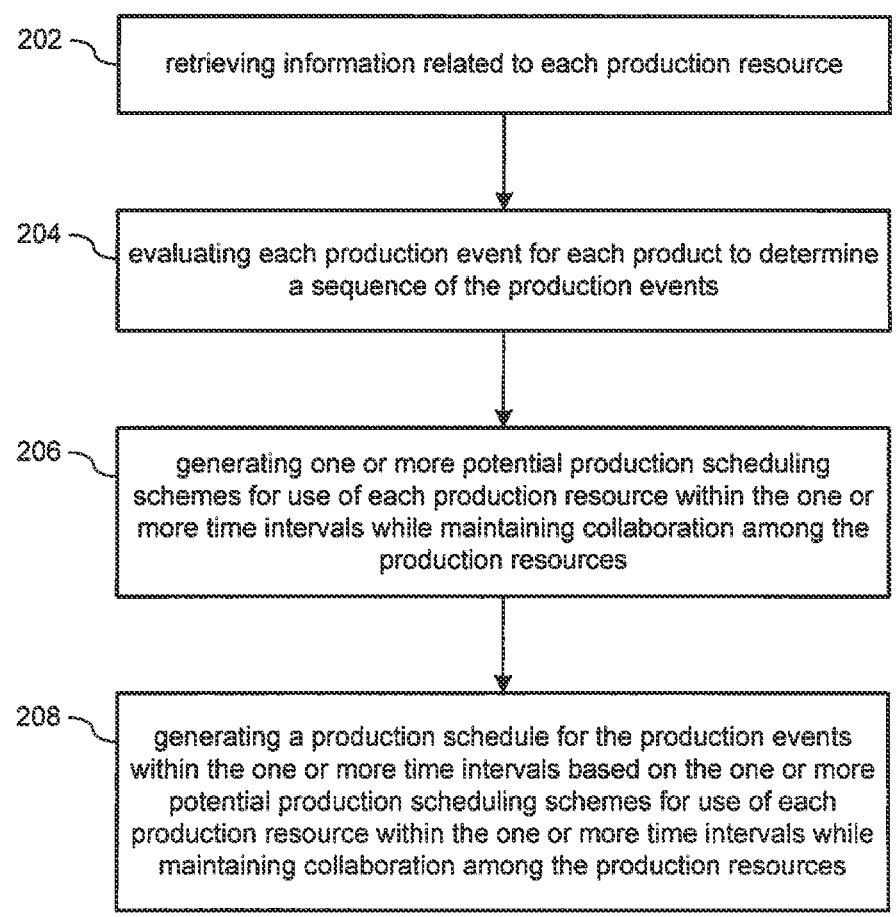
FIG. 2 is a process flow illustrating an example method for managing production scheduling, in accordance with aspects of the disclosure.

FIG. 2 is a process flow illustrating an example method 200 for managing production scheduling, in accordance with aspects of the disclosure.

In the example of FIG. 2, operations 202-208 are illustrated as discrete operations occurring in sequential order. However, it should be appreciated that, in other implementations, two or more of the operations 202-208 may occur in a partially or completely overlapping or parallel manner, or in a nested or looped manner, or may occur in a different order than that shown. Further, additional operations, that may not be specifically illustrated in the example of FIG. 2, may also be included in some implementations, while, in other implementations, one or more of the operations 202-208 may be omitted. Further, in various implementations, the method 200 may include a process flow for a computer-implemented method for managing production scheduling in the system 100 of FIG. 1A and the system 102 of 1B. Further, as described herein, the operations 202-208 may provide a simplified operational process flow that may be enacted by the computer system 108 to provide features and functionalities as described in reference to FIGS. 1A and 1B.

In an aspect of the disclosure, the method 200 of FIG. 2 may be provided for scheduling production events for each of a plurality of production resources 160 used to manufacture one or more products 170 relative to one or more time intervals while maintaining collaboration among the production resources 160. In some examples of a production environment, each product 170 may produced with use of the production resources 160, including one or more of the manufacture facilities 162, the transport facilities 164, and the assembly facilities 166.

In the example of FIG. 2, at 202, the method 200 may include retrieving information related to each production resource 160. At 204, the method 200 may include evaluating each production event for each product 170 to determine a sequence of the production events. At 206, the method 200 may include generating one or more potential production scheduling schemes for use of each production resource 160 within the one or more time intervals while maintaining collaboration among the production resources 160. At 208, the method 200 may include generating a production schedule for the production events within the one or more time intervals based on the one or more potential production scheduling schemes for use of each production resource 160 within the one or more time intervals while maintaining collaboration among the production resources 160.

Figure 3A:
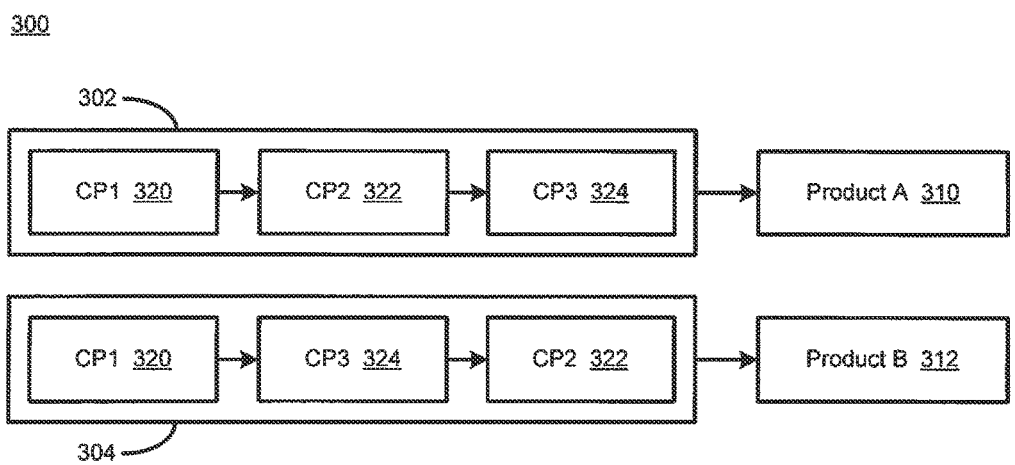
FIGS. 3A-3C are diagrams illustrating various example process workflows for product production, in accordance with aspects of the disclosure.
Figure 3B:
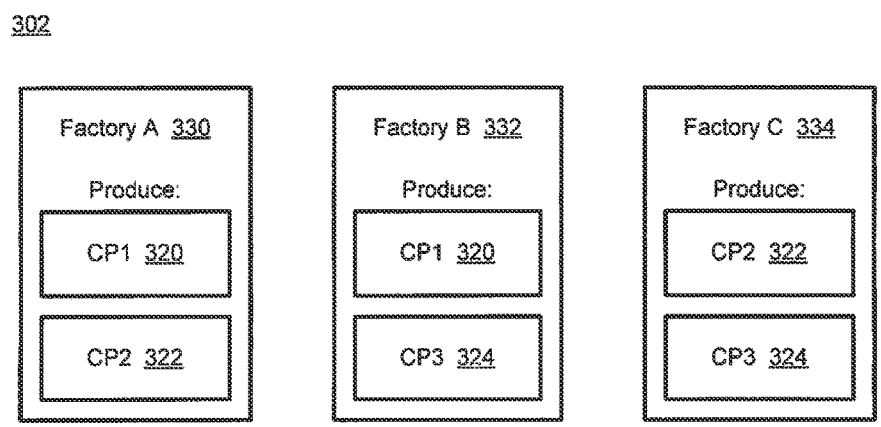
Figure 3C:
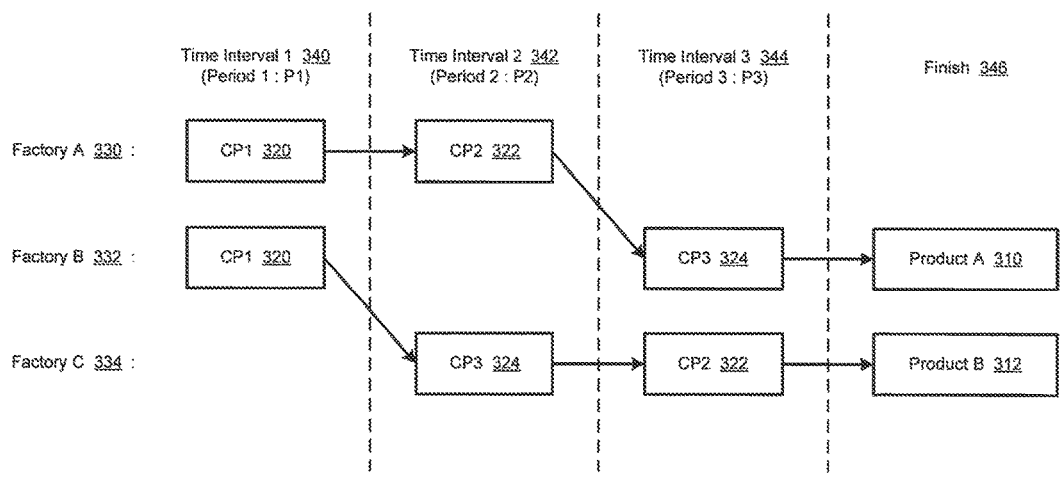

FIGS. 3A-3C are diagrams illustrating various example process workflows for product production, in accordance with aspects of the disclosure.

In particular, FIG. 3A shows a first workflow 302 for production of a first product A 310 and a second workflow 304 for production of a second product B 312, where the first product A 310 may be produced with three component parts CP1 320, CP2 322, and CP3 324 assembled in a first sequential order (i.e., first sequence of production), and the second product B 312 may be produced with the three component parts CP1 320, CP2 322, and CP3 324 assembled in a second sequential order (i.e., second sequence of production) different than the first sequential order.

FIG. 3B shows three factories, factory A 330, factory B 332, and factory C 334, where each of the first factory A 330, the second factory B 332, and the third factory C 334 produces multiple component parts for each of the first product A 310 and the second product B 312. For example, the first factory A 330 may be configured to produce the first CP1 320 and the second CP2 322, the second factory B 332 may be configured to produce the first CP1 320 and the third CP3 324, and the third factory C 334 may be configured to produce the second CP2 322 and the third CP3 324. In some examples, the factories (A, B, C) may only produce one component part (CP1, CP2, CP3) at a time and not at a same time, and one or more of the component parts (CP1, CP2, CP3) may be moved to a different factory to produce the component part.

FIG. 3C shows an example manufacturing schedule including three time intervals, a first time interval 340, a second time interval 342, and a third time interval 342 (i.e., periods, P1, P2, P3, respectively) for a corresponding factory A 330, B 332, C 334 to finish 346 producing the first product A 310 and the second product B 312. In various examples, this manufacture scheduling may involve at least two production goals including minimizing manufacturing time and minimizing transportation costs.

In the example of FIG. 3C, the first factory A 330 may produce the first component part CP1 320 in the first time interval 340, and the first factory A 330 may produce the second component part CP2 322 in the second time interval 342. Following, the second factory B 332 may produce the third component part CP3 324 in the third time interval 344, and production of the first product A 310 may be completed in the finish interval 346. Further, in the example of FIG. 3C, the second factory B 332 may produce the first component part CP1 320 in the first time interval 340, and the third factory C 334 may produce the third component part CP3 324 in the second time interval 342. Following, the third factory C 334 may produce the second component part CP2 322 in the third time interval 344, and production of the second product B 312 may be completed in the finish interval 346. In some examples, the first product A 310 and the second product B 312 may be produced simultaneously as shown in FIG. 3C.

In accordance with aspects of the disclosure, resource scheduling involves collaboration among multiple factories (e.g., entities, facilities, etc.). For instance, as shown in FIGS. 3A-3C, manufacturing of multiple products may be achieved in multiple different factories, and each product may be assembled from multiple component parts, where each component part may be produced in different factories. The assembling procedure may follow a workflow that includes a sequence of production events, such as for example, a sequence of connected steps. For example, in FIG. 3A, both product A 310 and product B 312 are assembled from three component parts 320, 322, 324, which may be produced sequentially in three factories 330, 332, 334. Sometimes, a factory may be unable to produce all necessary component parts of the products 310, 322, as shown in FIG. 3B. Thus, in a production cycle (i.e., workflow), component parts 320, 322, 324 may be moved between the three factories 330, 322, 324 so that all of the component parts 320, 322, 324 may be assembled according to the workflow.

For instance, as shown in FIG. 3C, factory A 330 may be configured to manufacture the first component part CP1 320 in the first time interval 340 and further manufacture (and/or assemble the first component part CP1 320 with/to) the second component part CP2 322 in the second time interval 342, and then transport them to the second factory B for manufacture (and/or assemble the first and second component parts CP1 320, CP2 322 with/to) the third component part CP3. In some examples, after all the component parts of the first product A 310 are produced, they are assembled into the first product A 310. In accordance with aspects of the disclosure, an optimized manufacture schedule may reduce the total manufacture time and reduce the transportation cost. To achieve an optimized manufacture schedule, aspects of the disclosure provide a genetic algorithm (GA) to optimize manufacture scheduling. As described herein, an efficient genetic encoding method is provided for representation of manufacture schedule along with various genetic operators including, for example, two crossovers and one mutation for the optimization of manufacture scheduling. These and various other related aspects of the disclosure are described in greater detail herein.

Figure 4:
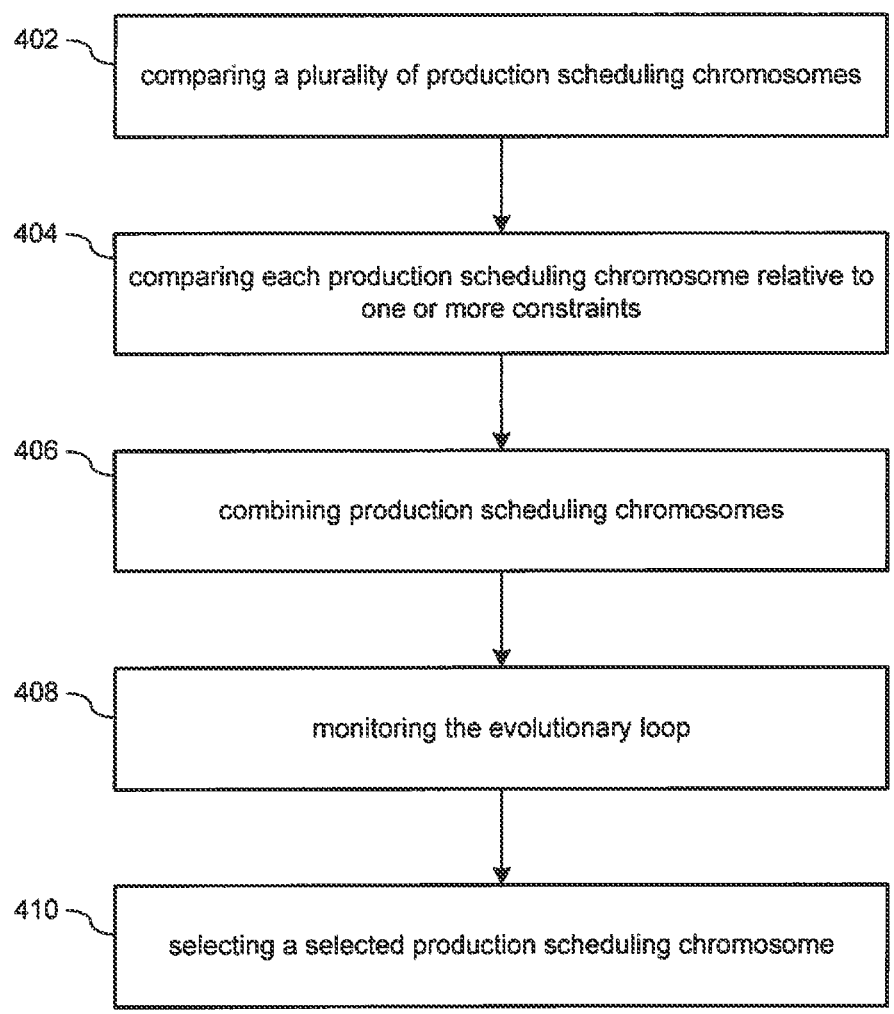
FIGS. 4-5 are process flows illustrating other example methods for managing production scheduling, in accordance with aspects of the disclosure.

FIG. 4 is a process flow illustrating another example method 400 for managing production scheduling, in accordance with aspects of the disclosure.

In the example of FIG. 4, operations 402-410 are illustrated as discrete operations occurring in sequential order. However, it should be appreciated that, in other implementations, two or more of the operations 402-410 may occur in a partially or completely overlapping or parallel manner, or in a nested or looped manner, or may occur in a different order than that shown. Further, additional operations, that may not be specifically illustrated in the example of FIG. 4, may also be included in some implementations, while, in other implementations, one or more of the operations 402-410 may be omitted. Further, in various implementations, the method 400 may include a process flow for a computer-implemented method for managing production scheduling in the system 100 of FIG. 1A and the system 102 of 1B. Further, as described herein, the operations 402-410 may provide an expanded operational process flow for operation 210 of method 200 of FIG. 2 that may be enacted by the computer system 108 to provide features and functionalities as described in reference to FIGS. 1A and 1B.

In an aspect of the disclosure, the method 400 of FIG. 4 may be provided for generating one or more potential production scheduling schemes for each production resource 160 based on the production events for each production resource 160 and the budget patterns for each production budget 180.

In the example of FIG. 4, at 402, the method 400 may include comparing a plurality of production scheduling chromosomes, wherein each production scheduling chromosome may include one or more potential production scheduling schemes for use of each production resource 160 within the one or more time intervals while considering one or more constraints related to product dependency trees for one or more products. At 404, the method 400 may include comparing each production scheduling chromosome relative to the one or more constraints to thereby output a selected subset of the plurality of production scheduling chromosomes.

At 406, the method 400 may include combining production scheduling chromosomes of the selected subset of the plurality of production scheduling chromosomes to obtain a next generation of production scheduling chromosomes for output and for subsequent comparison therewith of the next generation of production scheduling chromosomes with respect to the one or more constraints, as part of an evolutionary loop of the plurality of production scheduling chromosomes. At 408, the method 400 may include monitoring the evolutionary loop, and at 410, the method 400 may include selecting a selected production scheduling chromosome therefrom for implementation of a production schedule based thereon.

In an implementation, the method 400 may further include combining the production scheduling chromosomes including selecting pairs of production scheduling chromosomes and crossing over portions of each pair of production scheduling chromosomes to obtain a child chromosome of the next generation. The method 400 may further include executing at least a portion of the evolutionary loop using parallel processes in which each generation of production scheduling chromosomes is divided into sub-groups for parallel processing thereof. The method 400 may further include selecting the selected production scheduling chromosome after a predetermined number of generations of the evolutionary loop, or after determining that the selected production scheduling chromosome satisfies the one or more constraints to a predetermined extent.

Figure 5:
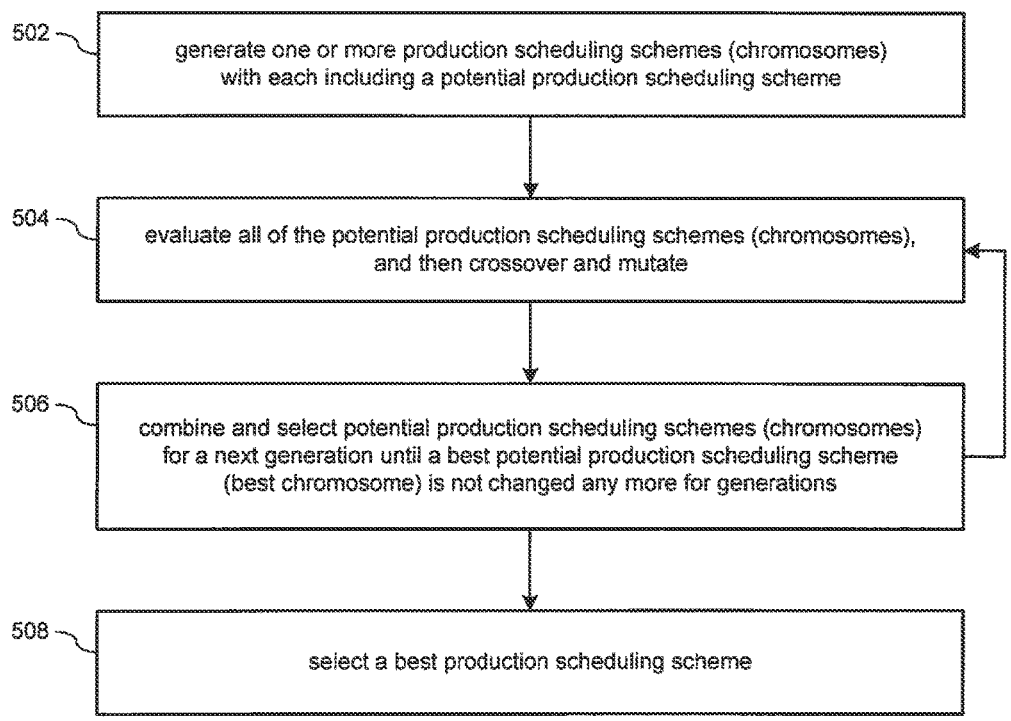

FIG. 5 is a process flow illustrating another example method 500 for managing production scheduling by implementing a forecast algorithm or a genetic algorithm for production scheduling, in accordance with aspects of the disclosure.

In the example of FIG. 5, operations 502-508 are illustrated as separate, sequential operations. However, it should be appreciated that two or more of the operations 502-508 may be conducted in a partially or completely overlapping or parallel manner. Moreover, the operations 502-508 may be implemented in a different order than that shown, and it should be appreciated that additional or alternative operations, not specifically illustrated in the example of FIG. 5, may be included, and one or more of the operations 502-508 may be omitted. Further, as illustrated with respect to the operations 510-508, various ones of the operations 502-508 may be implemented in an iterative, looped, or nested fashion, or otherwise may be implemented in an order and manner consistent with obtaining a desired production scheduling result from one or more of the system 100 of FIG. 1 and the system 102 of FIG. 1B.

At 502, the method 500 may be configured to generate one or more production scheduling schemes (chromosomes), wherein each generated production scheduling scheme (chromosome) includes a potential production scheduling scheme. In an example, the systems 100, 102 may be configured to compare a plurality of production scheduling chromosomes, wherein each production scheduling chromosome includes one or more potential production scheduling schemes for each production resource 160 within the one or more time intervals based on the production events for each production resource 160 and/or while considering constraints related to product dependency trees for each of the one or more products. The systems 100, 102 may be further configured to compare each of the plurality of production scheduling chromosomes relative to the production events and/or the constraints, to thereby output a selected subset of the plurality of production scheduling chromosomes. The systems 100, 102 may be further configured to combine the production scheduling chromosomes of the selected subset of the plurality of production scheduling chromosomes to obtain a next generation of production scheduling chromosomes and for subsequent comparison therewith of the next generation of production scheduling chromosomes with respect to the production events and/or the constraints, as part of an evolutionary loop of the plurality of production scheduling chromosomes. The systems 100, 102 may be further configured to monitor the evolutionary loop and select a selected production scheduling chromosome therefrom for implementation of the production scheduling based thereon.

In the example of FIG. 5, at 504, the method 500 may be configured to evaluate all of the potential production scheduling schemes (chromosomes), and then crossover and mutate. For instance, the systems 100, 102 may be configured to use a forecast algorithm or a genetic algorithm to crossover one or more of the chromosomes by combining the chromosomes in a role of parents to execute a simulation of sexual crossover to obtain a new child chromosome, which may be part of a new generation of chromosomes that may provide further crossover with other members of the same generation as part of an evolutionary loop to optimize the production scheduling process.

Therefore, the systems 100, 102 may be configured to provide a forecast algorithm or a genetic algorithm as a computer simulation of Darwinian natural selection that iterates through various generations to converge toward a best solution in the problem space. Further, in reference to mutation, one of the chromosomes may be randomly selected, then a position (i.e., gene) within the selected chromosome may be selected for mutation, and then the value of the randomly selected position (i.e., gene) may be randomly changed or mutated to produce one or more new characteristics that were not previously available.

At 506, the method 500 may be configured to combine and select potential production scheduling schemes (chromosomes) for a next generation until a best potential production scheduling scheme (best chromosome) is not changed any more for generations. In an example, the operations at 510 and 512 maybe repeated or cycled until the best potential production scheduling scheme (best chromosome) is achieved for subsequent selection. For instance, by using a forecast algorithm or a genetic algorithm, a best reasonable production scheduling scheme may be selected or determined for one or more forthcoming production scheduling in a closed circle or loop.

At 508, the method 500 may be configured to select a best production scheduling scheme with an optimized or maximized production schedule. In an example, by using the forecast algorithm or genetic algorithm, a best or most reasonable production scheduling scheme may be selected or determined for at least one forthcoming production schedule in reference to each production resource 160 while considering the optimized or maximized production schedule for each production resource 160.

As described herein, aspects of the disclosure are directed to a genetic algorithm (GA) based workflow management system and methods related thereto. In some implementations, the algorithm (GA) is configured for minimizing time cost of manufacturing procedures and further for minimizing transporting costs of manufactured component parts for multiple products. For example, when the number of products, component parts, and factories are large, minimization may become a NP-hard problem, such as NP-complete problem (i.e., nondeterministic polynomial time complete problem), which may be unable to be solved in polynominal-time. As such, the GA may be used in a method for solving optimization problems based on a natural selection process that mimics biological evolution. The GA may repeatedly modify a population of individual solutions. At each production event (or each process step), the GA may randomly select individuals from the current population and uses them as parents to produce children for a next generation. Over successive generations, for example, the population may "evolve" toward an optimal solution.

Figure 6:
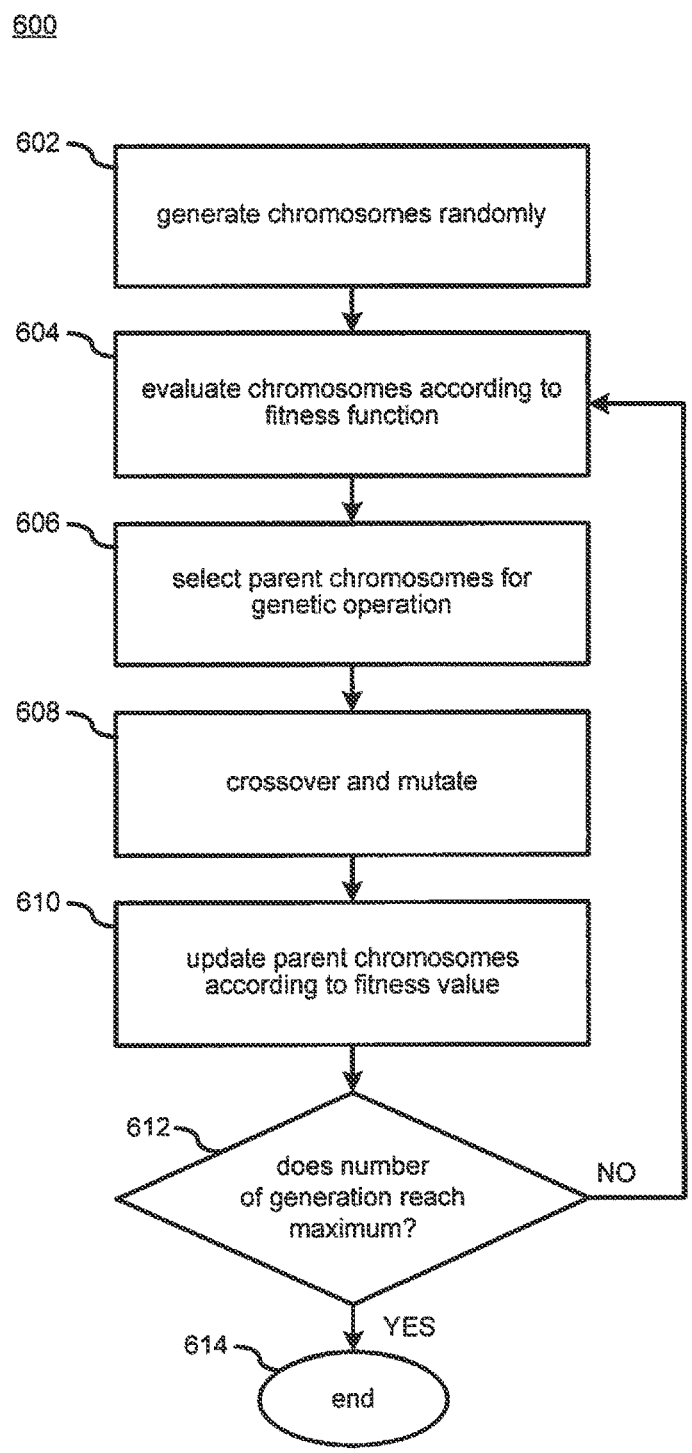
FIG. 6 is a process flow illustrating an example method for implementing a genetic algorithm for managing production scheduling, in accordance with aspects of the disclosure.

FIG. 6 is a process flow illustrating an example method 600 for implementing a genetic algorithm for managing production scheduling, in accordance with aspects of the disclosure. In the example of FIG. 6, operations 602-610 are illustrated as discrete operations occurring in sequential order. However, it should be appreciated that, in other implementations, two or more of the operations 602-610 may occur in a partially or completely overlapping or parallel manner, or in a nested or looped manner, or may occur in a different order than that shown. Further, additional operations, that may not be specifically illustrated in the example of FIG. 6, may also be included in some implementations, while, in other implementations, one or more of the operations 602-610 may be omitted. Further, in various implementations, the method 600 may include a process flow for a computer-implemented method for managing migration scheduling in the systems 100, 102, 104 of FIGS. 1A, 1B, 1C.

In reference to FIG. 6, at 602, the method 600 may include generating chromosomes (e.g., production scheduling chromosomes) randomly. At 604, the method 600 may include evaluating chromosomes according to the fitness function. At 606, the method 600 may include selecting parent chromosomes for genetic operation, in a manner as described further herein. At 608, the method 600 may include crossing-over and mutating the chromosomes, in a manner as described further herein. At 610, the method 600 may include updating the parent chromosomes according to the fitness value calculated with the fitness function value.

Further, at 612, the method 600 may include determining whether a number of generation reach a maximum. If no, the process flow returns to 604 to evaluate chromosomes according to the fitness function. If yes, the process flow of the method 600 terminates/ends at 614.

Figures 7, 8:
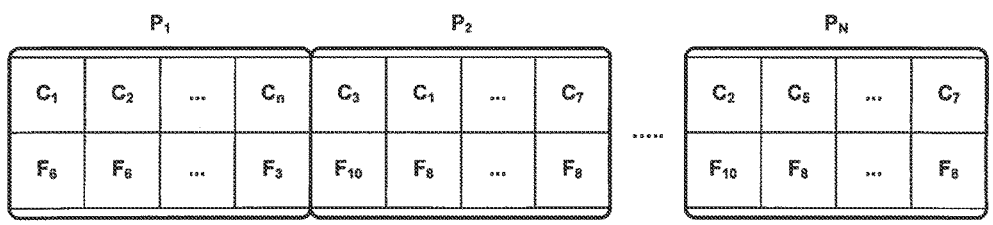
FIG. 7 is a diagram illustrating an example chromosome encoding for implementing a genetic algorithm, in accordance with aspects of the disclosure.
FIG. 8 is a diagram illustrating an example chromosome decoding for implementing a genetic algorithm, in accordance with aspects of the disclosure.

FIG. 7 is a diagram illustrating an example chromosome encoding 700 for implementing a genetic algorithm (GA), in accordance with aspects of the disclosure.

In the example of FIG. 7, a chromosome may be encoded as a workflow of manufacturing procedure. For instance, $P_i$ (i=1, 2, ..., N) may represent products to be manufactured, and $C_i$, (i=1, 2, ..., n) may denote sequential component parts in each product. Examples of component parts may be found in FIG. 3A and FIG. 3B. In some implementations, a variety of products may be composed of different kind or types of component parts, while these components may be needed and manufactured in different sequences. Therefore, in the example chromosome encoding 700, component parts of various products may be different, and a manufacture sequence of the component parts for various products may be different.

In the example chromosome encoding 700, genes may be defined as component parts to be manufactured and the manufacture sequence as well. The value of each gene may correspond to a factory $F_i$, (i=1, 2, ..., $n_f$). In this way, products are manufactured simultaneously, where necessary components are produced by associated factories in sequence. Moreover, the sequence of products may be meaningful although all of them may be manufactured at the same time. For example, it may be assumed that the first components of all the products may be allocated to the same factory, which may exceed production capacity of the factory. In this situation, only component parts of the headmost products in the example chromosome encoding 700 will be manufactured on time, while others may be suspended and delayed. Thus, manufacture priority may be changed by sorting product sequence in the chromosome encoding, which may be aimed and/or directed to reduce waiting time.

FIG. 8 is a diagram illustrating an example chromosome decoding 800 for implementing a genetic algorithm (GA), in accordance with aspects of the disclosure.

From each chromosome, a workflow of all the product manufacturing may be generated. In some examples, from a viewpoint of the example chromosome decoding 800, a chromosome may be defined as a manufacturing schedule for all the factories.

In the example of FIG. 8, one chromosome is decoded as manufacturing schedule for factories, where component parts may be produced in various sequences, 0 may refer to waiting time due to limitation of production capacity in each factory, and a length of a manufacturing list may be different among the factories.

For simplicity of explanation, in some examples, it may be assumed that manufacturing of various component parts cost the same time. Then, time cost of the whole manufacturing workflow may be obtained easily, which may be a maximum time requirement to finish manufacturing in all the factories. In other words, time cost of a chromosome may be represented as:

$$TimeCost = \max(len_{of_{F_i}}) \times t, \quad i = 1, 2, \ldots, f_n,$$

where len_of_$F_i$ denotes a length of $F_i$ in FIG. 8, and t denotes time cost of one component manufacturing.

Moreover, transportation cost may be obtained from FIG. 7, where cost is calculated as a sum of a number of unique factories in all the factories:

$$TransCost = \Sigma_{i=1}^{N} unique(factories).$$

Then, the fitness function is:

$$Fitness = \alpha \times TimeCost + (1-\alpha) \times TransCost,$$

where α represent a scaling parameter for trade-off.

Figure 9:
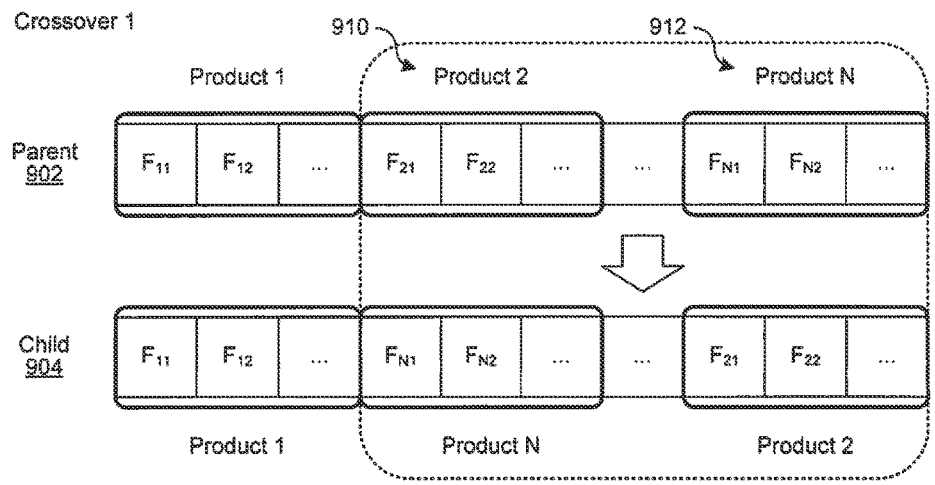
FIGS. 9-10 are block diagrams illustrating various types of crossovers of a chromosome, in accordance with aspects of the disclosure.

In some implementations, the system and methods described herein may be configured to use at least three genetic operators, including at least two types of crossover methods and at least one mutation method. FIG. 9 is a diagram illustrating a first type of crossover 1 900 of a chromosome, where two randomly selected product blocks 910, 912 (with all component parts included) are exchanged from a parent chromosome 902 to a child chromosome 904. In some examples, this operator may be aimed and/or directed to optimizing manufacture priority for all products.

Figure 10:
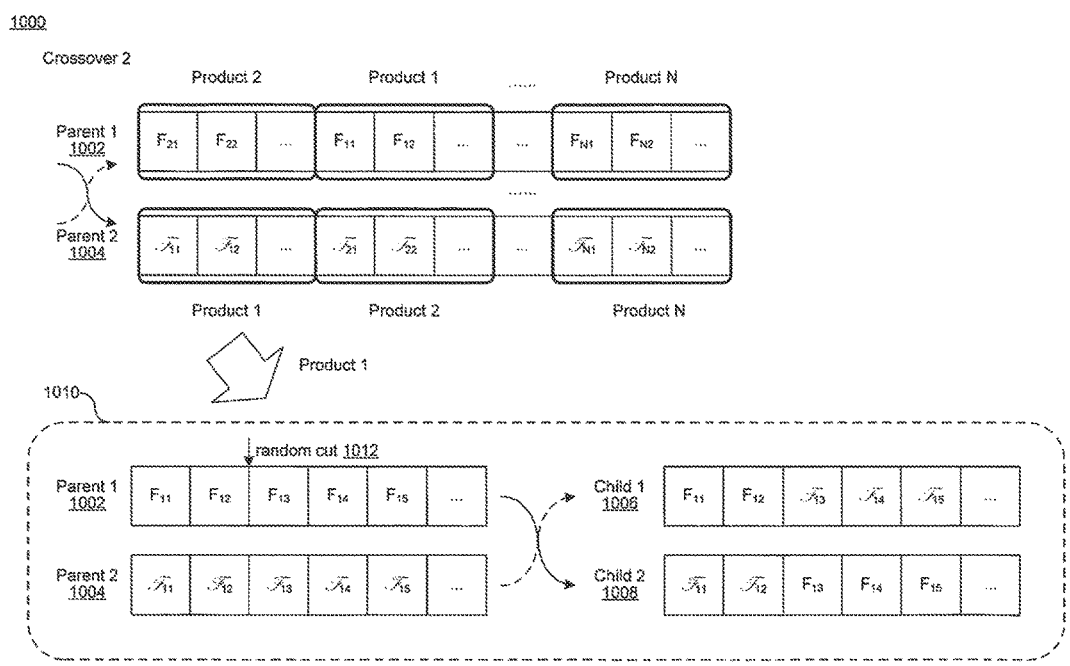

FIG. 10 is a diagram illustrating a second type of crossover 2 1000 of a chromosome, where in the second kind of crossover operator, two parent chromosomes 1002, 1004 may be recombined. Different from a conventional crossover on the whole chromosome, the proposed operator recombines genes within each product block separately. As shown in FIG. 10, the parent chromosomes 1002, 1004 may be randomly cut 1012 to generate child chromosomes 1006, 1008. Further, in the example of FIG. 10, crossover 2 1000 may be implemented for each product block in a parent chromosome pair 1002, 1004, where recombination details 1010 in product 1 are shown.

Figure 11:
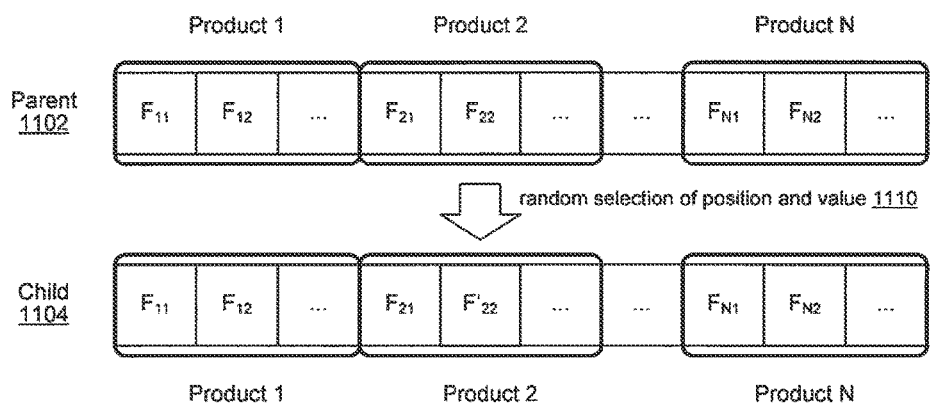
FIG. 11 is a block diagram illustrating a mutation of a chromosome, in accordance with aspects of the disclosure.

FIG. 11 is a diagram illustrating a mutation 1100 of a chromosome, where with a mutation operator, a gene may be selected and shifted randomly. FIG. 11 shows an example of mutation on a chromosome, where random selection of position and value 1110 from a parent chromosome 1102 is used to produce a child chromosome 1104. In this example, $F'_{22}$ may represent a different factory used for producing a component part for product 2. Mutation may be used to achieve better evolutionary selection.

In accordance with aspects of the disclosure, the techniques described herein may be represented by the following example pseudo code.

```
                           PSEUDO CODE
                           % Optimization
   % NumOfChrom: number of chromosomes in GA population
   % MaxGen: max number of generation
   % CrosRate1: cross rate for crossover 1
   % CrosRate2: cross rate for crossover 2
   % MutaRate: mutation rate
   %ParentChrom: parent chromosomes
   % ChildChrom: child chromosomes
   % InterChrom: combination of parent chromosomes and child
   chromosomes
1. FUNCTION Optimization
2. BEGIN
       % Initialization: a chromosome represents a possible solution
   of workflow of manufacture
3. Initialize NumOfChrom chromosomes randomly
4.     ParentChrom = Chromosomes
5. WHILE NOT CONVERGED
6. CALL FUNCTION Crossover(ParentChrom, CrosRate1, CrosRate2)
7.         CALL FUNCTION Mutation (ParentChrom, MutaRate)
8.         Combine ParentChrom and ChildChrom, which is denoted
   as InterChrom % Fitness Evaluation
9. CALL FUNCTION Fitness = Evaluate(InterChrom)
```

```
                           PSEUDO CODE
10.        Sort InterChrom according to Fitness
11.        Select the top NumOfChrom as ParentChrom for the next
           generation
12.    ENDWHILE
13. END
                           % Crossover
   % CrosRate1: cross rate of Crossover 1
   % CrosRate2: cross rate of Crossover 2
   %ParentChrom: parent chromosomes
   % ChildChrom: child chromosomes
   % NumOfChildChrom: the number of child chromosome
   % NumOfProduct: the number of product
   % n,m: the number of components of product i and j
14. FUNCTION ChildChrom = Crossover (ParentChrom, CrosRate1,
    CrosRate2)
15. BEGIN
16. Find all products by categorizing the components
17. WHILE NumOfChildChrom<NumOfChrom
18. IF rand( ) <CrosRate1
19.            Randomly select one parent chromosome as Parent
20.    Randomly select Product i and Product j in Parent
                  % select components of Product i and Product j
21.    Select genes of Parent[$i_1:i_n$] and Parent[$j_1:j_m$]
                  % the number of components in Product i
    and Product j equal to n and m, respectively
22.    Swap Parernt[$i_1:i_n$] and Parent[$j_1:j_m$]
23.    END IF
24.    IF rand( ) <CrosRate2
25.            Randomly select two parent chromosomes as
               Parent1 and Parent2
26.    FOR i = 1: NumOfProduct
27.    Randomly select a position p where crossover will happen
28.                  % the number of components in Product i
                  equals to n
29.        Swap Parent1[$i_1:i_p$] and Parent2[$i_p:i_n$]
30.    ENDFOR
31.    END IF
32.    END WHILE
33.    END
                           % Mutation
   % MutaRate: mutation rate
   % ParentChrom: parent chromosomes
   % ChildChrom: child chromosomes
   % NumOfChildChrom: the number of child chromosome
34. FUNCTION ChildChrom = Mutation (ParentChrom, MutaRate)
35. BEGIN
36. IF rand( ) <MutaRate
37. Randomly select one parent chromosome
38. Randomly select one position where the mutation will happen
39. i=Find the corresponding Product ID
40. Randomly change the value of selected gene into others gene ∈
    Product i
41.    ENDIF
42. END
                           % Evaluation
   % FitnessValue: the value of evaluation function
43. FUNCTION Evaluation (TimeCost, TransportCost)
44. BEGIN
45. FitnessValue = α × TimeCost + (1 − α) × TransportCost
46. END
                           % TimeCost
   % NumPeriod: the number of manufacture periods (total time)
47. FUNCTION TimeCost = PeriodEval (InterChrom)
48. BEGIN
49. TimeCost = 0
50. WHILE Production procedure not finished
51. FOR EACH Factory
52. Check dependency table of workflow
53. Produce non-finished components in factories
54.        TimeCost = Timecost + 1
55. ENDFOR
56.    ENDWHILE
57. END
                           % TransportCost
   % TransCost: the transportation cost
   % NumOfFac: the number of unique factories in each chromosome
58. FUNCTION TransCost = TransEval (InterChrom)
```

-continued

PSEUDO CODE

59. BEGIN
60. TransCost = 0
61. FORi=1:NumOfInterChrom
62. NumOfFac[i]=unique(InterChrom(i,:))
63.   ENDFOR
64. TransCost=sum(NumOfFac)
65. END Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system to manufacture one or more products, the computer system including instructions stored on a non-transitory computer-readable medium and executable by at least one processor, the system comprising:
   a production scheduling manager configured to cause the at least one processor to schedule production events for each of a plurality of production resources used to manufacture one or more products relative to one or more time intervals while considering constraints related to product dependency trees for each of the one or more products and maintaining collaboration among the plurality of production resources, at least two of the production resources manufacturing and outputting a same product or same product component, wherein the production scheduling manager includes:
   a production resource handler configured to retrieve information related to each of the plurality of production resource and evaluate each production event for each product to determine a sequence of the production events for each of the plurality of production resources;
   a production scheduling coordinator configured to generate a respective potential production scheduling scheme for use of each production resource within the one or more time intervals by modelling each constraint as a production scheduling chromosome, the production scheduling coordinator including a genetic algorithm handler to compare each of a plurality of production scheduling chromosomes relative to the constraints and, based on the comparison, select a subset of the production scheduling chromosomes to generate the respective potential production scheduling scheme for use of each production resource; and
   a production scheduling optimizer configured to generate a production schedule for the production events within the one or more time intervals based on the respective potential production scheduling schemes for use of each production resource within the one or more time intervals, wherein the production schedule includes a manufacturing schedule in which the one or more products are manufactured simultaneously and the component parts in each product are manufactured in sequence in the production resources, and wherein the production scheduling manager is further configured to manufacture the one or more products according to the production schedule for the production events at each of a plurality of production resources by minimizing a sum of a transportation cost between the different production resources and a time cost of manufacturing the component parts in different production resources, the time cost including costs in time and capital related to switching production events and operations from a first component part to a second component part in one of the different production resources and costs related to assembling each product from the component parts.

2. The system of claim 1, wherein one or more of the production resources are configured to manufacture one or more different component parts for each product.

3. The system of claim 1, wherein one or more of the production resources are configured to transport one or more different component parts for each product.

4. The system of claim 1, wherein one or more of the production resources are configured to assemble one or more different component parts for each product.

5. The system of claim 1, wherein one or more of the products are assembled from a plurality of different component parts manufactured by one or more different production resources of the plurality of production resources.

6. The system of claim 1, wherein scheduling the production events for each of a plurality of production resources includes moving production of one or more component parts between production resources to insure assembly of the one or more products according to a workflow of a production cycle including the sequence of the production events.

7. The system of claim 1, wherein:
the production events include manufacturing component parts for each product and transporting the manufactured component parts for assembly of the products, and
the production events include assembly of the products relative to the one or more time intervals, and assembly includes following a workflow of a production cycle including the sequence of the production events.

8. The system of claim 1, wherein the production resources include manufacturing facilities, transporting facilities, and assembling facilities.

9. The system of claim 1, wherein the production scheduling optimizer is configured to optimize the production schedule by reducing a time for manufacturing the one or more products by the production resources and reducing a cost of transporting the one or more products.

10. The system of claim 1, wherein:
the production resource handler is further configured to retrieve information related to one or more components parts of each product and retrieve information related to the sequence of the production events for manufacturing each product by the production resources as input for modeling as a chromosome by the production scheduling coordinator, and
the production scheduling coordinator is further configured to generate the one or more potential production scheduling schemes based on retrieved information that is modeled as the chromosome.

11. The system of claim 1, wherein the genetic algorithm handler includes:
a chromosome comparator configured to compare a plurality of production scheduling chromosomes, each production scheduling chromosome including the one or more potential production scheduling schemes for use of each production resource within the one or more time intervals while maintaining collaboration among the production resources, and configured to compare each of the plurality of production scheduling chromosomes relative to maintaining collaboration among the production resources, to thereby output a selected subset of the plurality of production scheduling chromosomes; and
a chromosome combiner configured to combine production scheduling chromosomes of the selected subset of the production scheduling chromosomes to obtain a next generation of production scheduling chromosomes for output to the chromosome comparator and for subsequent comparison therewith of the next generation of production scheduling chromosomes with respect to maintaining collaboration among the production resources, as part of an evolutionary loop of the production scheduling chromosomes between the chromosome comparator and the chromosome combiner,
wherein the production scheduling optimizer is further configured to monitor the evolutionary loop and select a selected production scheduling chromosome therefrom for implementation of the production schedule based thereon.

12. The system of claim 11, wherein the chromosome combiner is further configured to combine the production scheduling chromosomes including selecting pairs of production scheduling chromosomes and crossing over portions of each pair of production scheduling chromosomes to obtain a child chromosome of the next generation.

13. The system of claim 11, wherein at least a portion of the evolutionary loop is executed using parallel processes in which each generation of production scheduling chromosomes is divided into sub-groups for parallel processing thereof.

14. The system of claim 11, wherein the production scheduling optimizer is further configured to select the selected production scheduling chromosome after a predetermined number of generations of the evolutionary loop, or after determining that the selected production scheduling chromosome satisfies maintaining collaboration among the production resources.

15. A computer program product, the computer program product being tangibly embodied on a non-transitory computer-readable storage medium and comprising instructions that, when executed by at least one processor, are configured to:
schedule production events for each of a plurality of production resources used to manufacture one or more products relative to one or more time intervals while considering constraints related to product dependency trees for each of the one or more products and maintaining collaboration among the production resources, at least two of the production resources manufacturing and outputting a same product or same product component, wherein the instructions, when executed by the at least one processor, are further configured to:
retrieve information related to each of the plurality of production resources,
evaluate each production event for each product to determine a sequence of the production events for each of the plurality of production resources,
generate a respective potential production scheduling scheme for use of each production resource within the one or more time intervals by:
modelling each constraint as a production scheduling chromosome, and using a genetic algorithm handler to compare each of a plurality of production scheduling chromosomes relative to the constraints to select a subset of the production scheduling chromosomes to generate the respective potential production scheduling scheme for use of each production resource;

generate a production schedule for the production events within the one or more time intervals based on the respective potential production scheduling schemes for use of each of the plurality of production resources within the one or more time intervals, wherein the production schedule includes a manufacturing schedule in which the one or more products are manufactured simultaneously and the component parts in each product are manufactured in sequence in the production resources; and manufacture the one or more products according to the production schedule for the production events at each of a plurality of production resources by minimizing a sum a transportation cost between the different production resources and a time cost of manufacturing the component parts in different production resources, the time cost including costs in time and capital related to switching production events and operations from a first component part to a second component part in one of the different production resources and costs related to assembling each product from the component parts.

16. The computer program product of claim 15, further comprising instructions that, when executed by the processor, are configured to:

compare a plurality of production scheduling chromosomes, each production scheduling chromosome including the one or more potential production scheduling schemes for use of each production resource within the one or more time intervals while maintaining collaboration among the production resources;

compare each of the plurality of production scheduling chromosomes relative to maintaining collaboration among the production resources, to thereby output a selected subset of the plurality of production scheduling chromosomes;

combine production scheduling chromosomes of the selected subset of the production scheduling chromosomes to obtain a next generation of production scheduling chromosomes and for subsequent comparison therewith of the next generation of production scheduling chromosomes with respect to maintaining collaboration among the production resources, as part of an evolutionary loop of the production scheduling chromosomes; and monitor the evolutionary loop and selecting a selected production scheduling chromosome therefrom for implementation of the production schedule based thereon.

17. The computer program product of claim 16, further comprising instructions that, when executed by the processor, are configured to:

combine the production scheduling chromosomes including selecting pairs of production scheduling chromosomes and crossing over portions of each pair of production scheduling chromosomes to obtain a child chromosome of the next generation;

execute at least a portion of the evolutionary loop using parallel processes in which each generation of production scheduling chromosomes is divided into subgroups for parallel processing thereof; and select the selected production scheduling chromosome after a predetermined number of generations of the evolutionary loop, or after determining that the selected production scheduling chromosome satisfies maintaining collaboration among the production resources.

18. A computer-implemented method, comprising:

scheduling production events for each of a plurality of production resources used to manufacture one or more products relative to one or more time intervals while considering constraints related to product dependency trees for each of the one or more products and maintaining collaboration among the production resources by:

retrieving information related to each of the plurality of production resources;

evaluating each production event for each product to determine a sequence of the production events for each of the plurality of production resources;

generating a respective potential production scheduling scheme for use of each production resource within the one or more time intervals by modelling each constraint as a production scheduling chromosome, using a genetic algorithm handler to compare each of a plurality of production scheduling chromosomes relative to the constraints and, based on the comparison, select a subset of the production scheduling chromosomes to generate the respective potential production scheduling scheme for use of each production resource;

generating a production schedule for the production events within the one or more time intervals based on the respective potential production scheduling schemes for use of each production resource within the one or more time intervals, wherein the production schedule includes a manufacturing schedule in which the one or more products are manufactured simultaneously and the component parts in each product are manufactured in sequence in the production resources; and manufacturing the one or more products according to the production schedule for the production events at each of a plurality of production resources by minimizing a sum of and a transportation cost between the different production resources and a time cost of manufacturing the component parts in different production resources, the time cost including costs in time and capital related to switching production events and operations from a first component part to a second component part in one of the different production resources and costs related to assembling each product from the component parts.

19. The method of claim 18, further comprising:

comparing a plurality of production scheduling chromosomes, each production scheduling chromosome including the one or more potential production scheduling schemes for use of each production resource within the one or more time intervals while maintaining collaboration among the production resources;

comparing each of the plurality of production scheduling chromosomes relative to maintaining collaboration among the production resources, to thereby output a selected subset of the plurality of production scheduling chromosomes;

combining production scheduling chromosomes of the selected subset of the production scheduling chromosomes to obtain a next generation of production scheduling chromosomes and for subsequent comparison therewith of the next generation of production scheduling chromosomes with respect to maintaining collaboration among the production resources, as part of an evolutionary loop of the production scheduling chromosomes; and monitoring the evolutionary loop and selecting a selected production scheduling chromosome therefrom for implementation of the production schedule based thereon.

20. The method of claim 19, further comprising:
combining the production scheduling chromosomes including selecting pairs of production scheduling chromosomes and crossing over portions of each pair of production scheduling chromosomes to obtain a child chromosome of the next generation;
executing at least a portion of the evolutionary loop using parallel processes in which each generation of production scheduling chromosomes is divided into subgroups for parallel processing thereof; and
selecting the selected production scheduling chromosome after a predetermined number of generations of the evolutionary loop, or after determining that the selected production scheduling chromosome satisfies maintaining collaboration among the production resources.

* * * * *